(12) United States Patent
Slaughter et al.

(10) Patent No.: US 7,680,950 B1
(45) Date of Patent: *Mar. 16, 2010

(54) EFFICIENT SEARCH FOR STORAGE OBJECTS IN A NETWORK

(75) Inventors: Gregory L. Slaughter, Palo Alto, CA (US); Xiaohui Dawn Chen, Milpitas, CA (US); Ruchir Tewari, Sunnyvale, CA (US)

(73) Assignee: Symantec Operating Corporation, Mountain View, CA (US)

( * ) Notice: Subject to any disclaimer, the term of this patent is extended or adjusted under 35 U.S.C. 154(b) by 1244 days.

This patent is subject to a terminal disclaimer.

(21) Appl. No.: 10/704,271

(22) Filed: Nov. 7, 2003

(51) Int. Cl.
G06F 15/173 (2006.01)

(52) U.S. Cl. .................. 709/238; 709/203; 709/232; 709/243; 370/351; 370/428

(58) Field of Classification Search .................. 709/203, 709/232, 243, 238; 370/428, 351
See application file for complete search history.

(56) References Cited

U.S. PATENT DOCUMENTS

| 4,354,229 | A | 10/1982 | Davis et al. |
|---|---|---|---|
| 5,606,669 | A | 2/1997 | Bertin et al. |
| 5,701,462 | A | 12/1997 | Whitney et al. |
| 5,761,421 | A | 6/1998 | van Hoff et al. |
| 5,764,982 | A | 6/1998 | Madduri |
| 5,790,553 | A | 8/1998 | Deaton, Jr. et al. |
| 5,802,278 | A | 9/1998 | Isfeld et al. |
| 5,832,195 | A | 11/1998 | Braun et al. |
| 5,918,017 | A | 6/1999 | Attanasio et al. |
| 5,920,566 | A | 7/1999 | Hendel et al. |
| 5,928,326 | A | 7/1999 | Boudou et al. |
| 6,012,096 | A | 1/2000 | Link et al. |
| 6,016,478 | A | 1/2000 | Zhang et al. |
| 6,049,823 | A | 4/2000 | Hwang |
| 6,088,336 | A | 7/2000 | Tosey |
| 6,091,724 | A | 7/2000 | Chandra et al. |
| 6,144,992 | A | 11/2000 | Turpin et al. |
| 6,148,383 | A | 11/2000 | Micka et al. |
| 6,167,432 | A | 12/2000 | Jiang |
| 6,173,374 | B1 | 1/2001 | Heil et al. |
| 6,185,618 | B1 | 2/2001 | Brabson |
| 6,189,079 | B1 | 2/2001 | Micka et al. |
| 6,219,710 | B1 | 4/2001 | Gray et al. |
| 6,272,386 | B1 | 8/2001 | McLaughlin et al. |

(Continued)

OTHER PUBLICATIONS

A. Rowstron and P. Druschel. "Pastry: Scalable, distributed object location and routing for large-scale peer-to-peer systems." In Proc. *IFIP/ACM Middleware 2001*, Heidelberg, Germany, Nov. 2001.

(Continued)

*Primary Examiner*—Thu Ha T Nguyen
(74) *Attorney, Agent, or Firm*—Moser IP Law Group

(57) ABSTRACT

A system and method related to efficiently searching for an object in a network including a plurality of realms, e.g., a plurality of local area networks (LANs). The method may ensure that nodes within a LAN are able to locate objects within that LAN using only computing resources on the local LAN. Thus, expensive WAN transfers may be avoided where possible. The system may also scale to many nodes. Nodes may not be required to know about every other node in the system. Mechanisms for re-distributing object location information among nodes as nodes are added to and removed from the system are also described.

18 Claims, 10 Drawing Sheets

U.S. PATENT DOCUMENTS

| | | | |
|---|---|---|---|
| 6,275,888 | B1 | 8/2001 | Porterfield |
| 6,304,980 | B1 | 10/2001 | Beardsley et al. |
| 6,314,491 | B1 | 11/2001 | Freerksen et al. |
| 6,317,438 | B1 | 11/2001 | Trebes, Jr. |
| 6,415,280 | B1 | 7/2002 | Farber et al. |
| 6,434,638 | B1 | 8/2002 | Deshpande |
| 6,553,031 | B1 | 4/2003 | Nakamura et al. |
| 6,584,075 | B1 | 6/2003 | Gupta et al. |
| 6,611,872 | B1 | 8/2003 | McCanne |
| 6,631,449 | B1 | 10/2003 | Borrill |
| 6,636,886 | B1 | 10/2003 | Katiyar et al. |
| 6,643,650 | B1 | 11/2003 | Slaughter et al. |
| 6,667,957 | B1 | 12/2003 | Corson et al. |
| 6,748,381 | B1 | 6/2004 | Chao et al. |
| 6,839,769 | B2 * | 1/2005 | Needham et al. ............ 709/243 |
| 6,850,987 | B1 | 2/2005 | McCanne et al. |
| 6,871,235 | B1 | 3/2005 | Cain |
| 2002/0065919 | A1 | 5/2002 | Taylor |
| 2002/0103998 | A1 | 8/2002 | DeBruine |
| 2002/0114341 | A1 * | 8/2002 | Sutherland et al. .......... 370/428 |
| 2002/0143855 | A1 | 10/2002 | Traversat et al. |
| 2002/0147771 | A1 * | 10/2002 | Traversat et al. ............ 709/203 |
| 2002/0147815 | A1 | 10/2002 | Tormasov |
| 2002/0184311 | A1 | 12/2002 | Traversat et al. |
| 2003/0041141 | A1 | 2/2003 | Abdelaziz et al. |
| 2003/0225796 | A1 * | 12/2003 | Matsubara .................. 707/200 |
| 2003/0233281 | A1 * | 12/2003 | Takeuchi et al. ............... 705/26 |
| 2004/0044727 | A1 | 3/2004 | Abdelaziz et al. |
| 2004/0064512 | A1 * | 4/2004 | Arora et al. .................. 709/206 |
| 2004/0064568 | A1 | 4/2004 | Arora et al. |
| 2004/0088347 | A1 | 5/2004 | Yeager et al. |
| 2004/0088348 | A1 | 5/2004 | Yeager et al. |
| 2004/0088646 | A1 | 5/2004 | Yeager et al. |
| 2004/0098447 | A1 | 5/2004 | Verbeke et al. |
| 2004/0148326 | A1 | 7/2004 | Nadgir et al. |
| 2004/0162871 | A1 | 8/2004 | Pabla et al. |
| 2005/0289237 | A1 * | 12/2005 | Matsubara et al. .......... 709/232 |

OTHER PUBLICATIONS

Zhao, et al "Tapestry: An Infrastructure for Fault-tolerant Wide-area Location and Routing" *UCB Tech. Report UCB/CSD-01-1141.* Apr. 2001.

Stoica, et al "Chord: A Scalable Peer-to-peer Lookup Service for Internet Applications," *ACMSIGCOMM 2001*, San Diego, CA, Aug. 2001, pp. 149-160.

Manku, et al, "Symphony: Distributed Hashing in a Small World" Published in USITS, 2003.

Kubiatowicz, et al "OceanStore: An Architecture for Global-scale Persistent Storage" *Proceedings of ACM ASPLOS*, Nov. 2000.

Adya, et al; "FARSITE: Federated, Available, and Reliable Storage for an Incompletely Trusted Environment"; *Proceedings of the $5^{TH}$ OSDI*, Dec. 2002.

Garces-Erice, et al; "Hierarchical Peer-to-Peer Systems," In the Special issue of the *Parallel Processing Letters* (PPL), Dec. 2003, vol. 13, No. 4.

"A Case for Hierarchical Distributed Hash Tables," Gummadi, et al, University of Washington.

"Lustre Whitepaper Version 1.0" Cluster File Systems, Inc., Nov. 11, 2002.

"Large Scale Peer-to-Peer Experiments with Virtual Private Community (VPC) Framework," Iwao, et al., CIA 2002, LNAI 2446, pp. 66-81, 2002.

"BestPeer: A Self-Configurable Peer-to-Peer System," Ng, et al, Department of Computer Science, National University of Singapore, pp. 1-21.

Traversat, et al, "Project JXTA Virtual Network", Feb. 5, 2002, http://www.jxta.org/docs/JXTAprotocols.pdf.

* cited by examiner

EFFICIENT SEARCH FOR STORAGE OBJECTS IN A NETWORK

BACKGROUND OF THE INVENTION

1. Field of the Invention

This invention relates to computer networks and, more particularly, to a system and method for efficiently locating an object, e.g., a storage object, in a computer network.

2. Description of the Related Art

Computer networks are important for many different applications. One important type of networking is referred to as peer-to-peer or P2P networking. As used herein, a peer-to-peer network is generally used to describe a decentralized network of peer nodes where each node may have similar capabilities and/or responsibilities. Participating peer nodes in a P2P network may communicate directly with each other. Work may be done and information may be shared through interaction among the peers. In addition, in a P2P network, a given peer node may be equally capable of serving as either a client or a server for another peer node.

A peer-to-peer network may be created to fulfill some specific need, or it may be created as a general-purpose network. Some P2P networks are created to deliver one type of service and thus typically run one application. For example, Napster was created to enable users to share music files. Other P2P networks are intended as general purpose networks which may support a large variety of applications. Any of various kinds of distributed applications may execute on a P2P network. Exemplary peer-to-peer applications include file sharing, messaging applications, distributed data storage, distributed processing, etc.

Although P2P networks offer certain advantages over conventional client-server architectures, prior P2P networks have suffered from scaling problems. One important obstacle to scaling has been the lack of an efficient search mechanism to locate objects stored on various nodes in the P2P network. It is often necessary for various nodes in a P2P network to locate objects stored on other nodes.

P2P networks can include a plurality of local area networks (LANs) that are joined together by wide area network (WAN) connections. Accesses across a WAN connection are typically expensive and have significantly higher latencies than accesses across a LAN connection. Prior search mechanisms that have been developed for P2P networks have not ensured that nodes within a LAN are able to locate objects within that LAN using only computing resources on the local LAN. Without this assurance, the overall system tends to have very high latencies and squanders limited expensive WAN bandwidth. Also, in large systems with many nodes, scaling would suffer if every node needed to know how to reach every other node in order to locate the various objects.

SUMMARY

Various embodiments of a system and method related to searching for an object in a network are disclosed. The network may include a plurality of realms, e.g., a plurality of local area networks (LANs).

According to one embodiment, a first node in a first LAN may select a second node in the first LAN to store location information for a first object located on the first node. The first node may send the location information for the first object to the second node, and the second node may store the location information for the first object. The location information stored for the first object may specify that the first object is located on the first node.

The first node may also select a second LAN to store location information for the first object. The first node may send the location information for the first object to the second LAN, and a third node in the second LAN may store the location information for the first object.

In one embodiment, a fourth node in the first LAN may subsequently perform a search operation to locate the first object. In performing the search operation, the fourth node may determine the second node to query for location information for the first object and may query the second node for the location information. In response, the second node may return the location information for the first object to the fourth node. The fourth node may then utilize the location information to access the first object on the first node.

In one embodiment, a fourth node in a third LAN may subsequently perform a search operation to locate the first object. In performing the search operation, the fourth node may first attempt to lookup the location information for the first object from a node in the third LAN. Thus, the fourth node may determine a fifth node in the third LAN to query for location information for the first object and may query the fifth node for the location information. In response, the fourth node may receive an indication from the fifth node that the fifth node does not have location information for the first object. The fourth node may then determine the second LAN as a remote LAN to query for location information for the first object and may send a query for the location information to the second LAN. The third node in the second LAN may receive the query and may send the location information for the first object to the fourth node in response. The fourth node may then utilize the location information to access the first object on the first node.

BRIEF DESCRIPTION OF THE DRAWINGS

A better understanding of the invention can be obtained when the following detailed description is considered in conjunction with the following drawings, in which.

Figure 1:
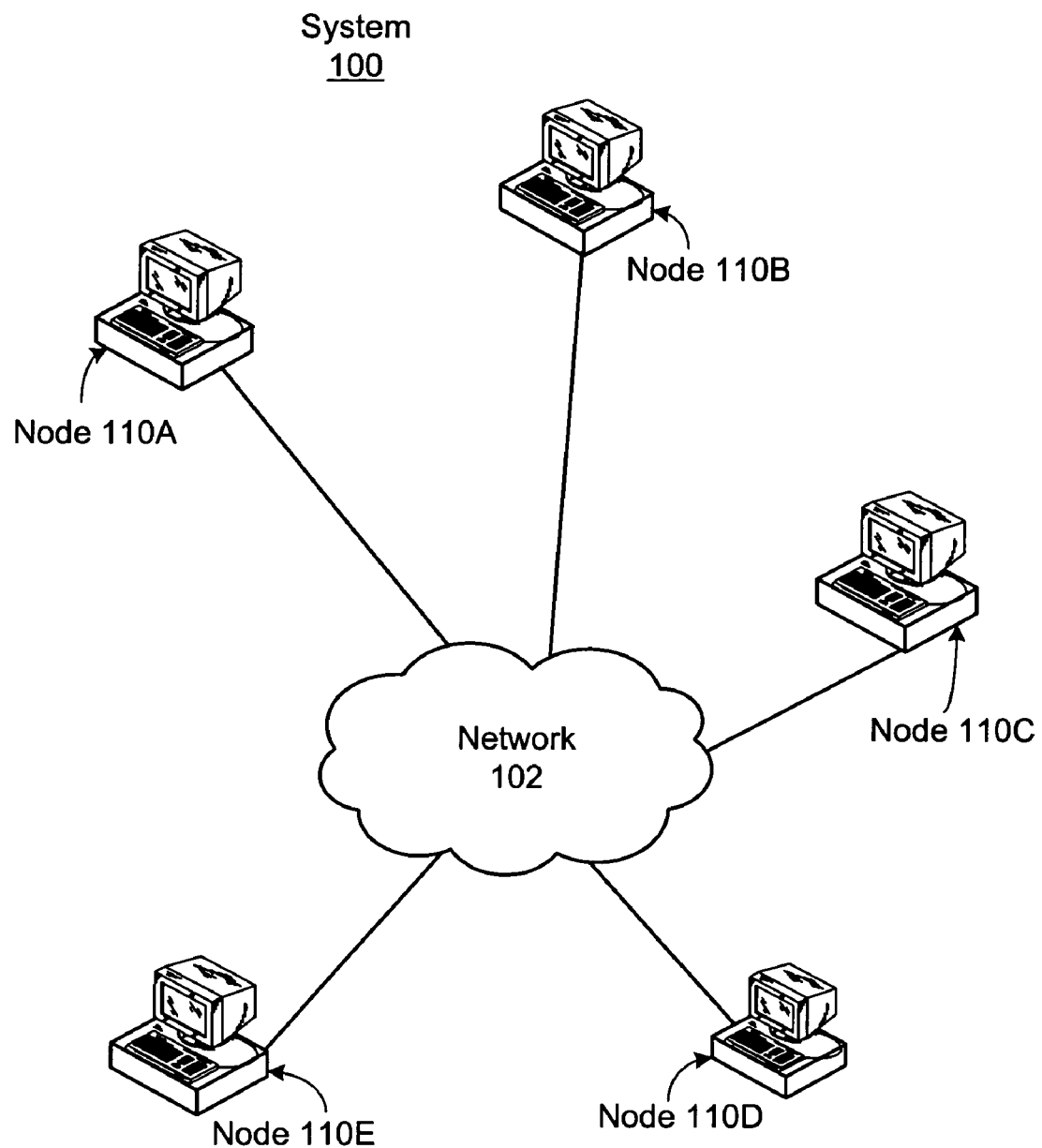
FIG. 1 illustrates one embodiment of a system in which a plurality of storage objects are stored.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 illustrates one embodiment of a system 100 in which a plurality of storage objects may be stored. In this example, the system 100 includes nodes (e.g., computer systems) 110A-110E, although in various embodiments any number of nodes may be present. It is noted that throughout this disclosure, drawing features identified by the same reference number followed by a letter (e.g., nodes 110A-110E) may be collectively referred to by that reference number alone (e.g., nodes 110) where appropriate.

As shown, nodes 110A-110E may be coupled through a network 102. In various embodiments, the network 102 may include any type of network or combination of networks. For example, the network 102 may include any type or combination of local area network (LAN), a wide area network (WAN), an Intranet, the Internet, etc. Exemplary local area networks include Ethernet networks, Fiber Distributed Data Interface (FDDI) networks, and token ring networks. Also, each node 110 may be coupled to the network 102 using any type of wired or wireless connection medium. For example, wired mediums may include a modem connected to plain old telephone service (POTS), Ethernet, fiber channel, etc. Wireless connection mediums may include a satellite link, a modem link through a cellular service, a wireless link such as Wi-Fi™, a wireless connection using a wireless communication protocol such as IEEE 802.11 (wireless Ethernet), Bluetooth, etc.

In one embodiment, the nodes 110 may form a peer-to-peer network. For example, the system 100 may comprise a decentralized network of nodes 110 where each node 110 may have similar capabilities and/or responsibilities. As described below, each node 110 may communicate directly with at least a subset of the other nodes 110. In one embodiment, messages may be propagated through the system 100 in a decentralized manner. For example, in one embodiment each node 110 in the system 100 may effectively act as a message router.

In another embodiment, the nodes 110 in the system 100 may be organized or may communicate using a centralized networking methodology, or the system 100 may utilize a combination of centralized and decentralized networking methodologies. For example, some functions of the system 100 may be performed by using various nodes 110 as centralized servers, whereas other functions of the system 100 may be performed in a peer-to-peer manner.

In one embodiment, each node 110 may have an identifier (ID). The ID of a node 110 may comprise any kind of information usable to identify the node 110, such as numeric or textual information. In one embodiment, a node ID may comprise a 128-bit Universally Unique ID (UUID). Universally Unique IDs or UUIDs may be allocated based on known art that ensures that the UUIDs are unique.

Figure 2:
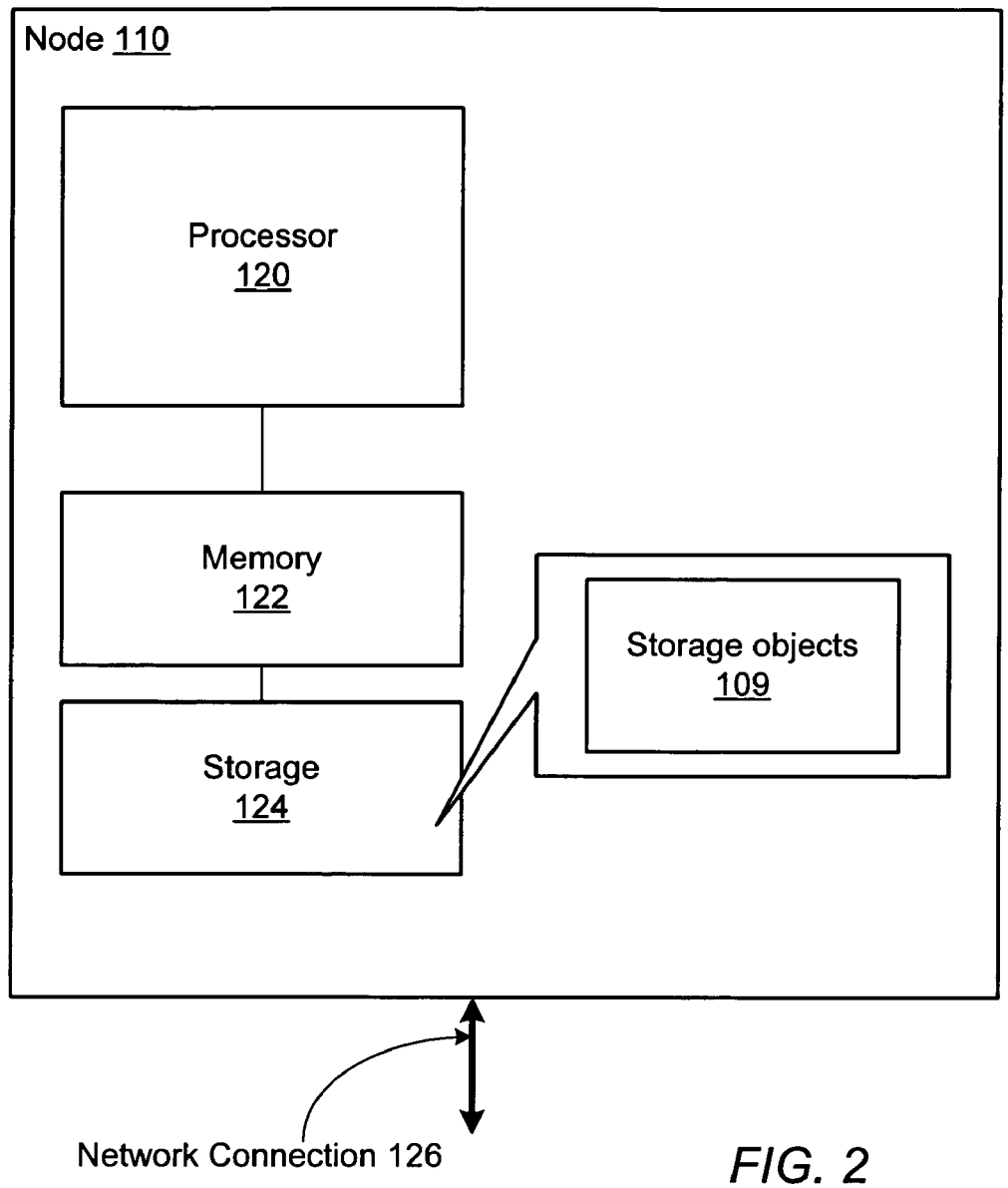
FIG. 2 illustrates one embodiment of a node in the system.

Referring now to FIG. 2, a diagram of one embodiment of a node 110 in the system 100 is illustrated. Generally speaking, a node 110 may include any of various hardware and software components. In the illustrated embodiment, the node 110 includes a processor 120 coupled to a memory 122, which is in turn coupled to a storage 124. The node 110 may also include a network connection 126 through which the node 110 couples to the network 102. The network connection 126 may include any type of hardware for coupling the node 110 to the network 102, e.g., depending on the type of node 110 and type of network 102.

The processor 120 may be configured to execute instructions and to operate on data stored within the memory 122. In one embodiment, the processor 120 may operate in conjunction with the memory 122 in a paged mode, such that frequently used pages of memory may be paged in and out of the memory 122 from the storage 124 according to conventional techniques. It is noted that the processor 120 is representative of any type of processor. For example, in one embodiment, the processor 120 may be compatible with the x86 architecture, while in another embodiment the processor 120 may be compatible with the SPARC™ family of processors. Also, in one embodiment the node 110 may include multiple processors 120.

The memory 122 may be configured to store instructions and/or data. In one embodiment, the memory 122 may include one or more forms of random access memory (RAM) such as dynamic RAM (DRAM) or synchronous DRAM (SDRAM). However, in other embodiments, the memory 122 may include any other type of memory instead or in addition.

The storage 124 may be configured to store instructions and/or data, e.g., may be configured to store instructions and/or data in a persistent or non-volatile manner. In one embodiment, the storage 124 may include non-volatile memory, such as magnetic media, e.g., one or more hard drives, or optical storage. In one embodiment, the storage 124 may include a mass storage device or system. For example, in one embodiment, the storage 124 may be implemented as one or more hard disks configured independently or as a disk storage system. In one embodiment, the disk storage system may be an example of a redundant array of inexpensive disks (RAID) system. In an alternative embodiment, the disk storage system may be a disk array, or Just a Bunch Of Disks (JBOD), (used to refer to disks that are not configured according to RAID). In yet other embodiments, the storage 124 may include tape drives, optical storage devices or RAM disks, for example.

As shown in FIG. 2, in one embodiment the storage 124 may store one or more storage objects 109. As used herein, the term "storage object" may comprise any kind of data structure or entity used to store or represent data or information. In one embodiment, each storage object 109 may comprise a file. The storage objects 109 may include data or information of any kind, where the data is organized or structured in any way. In various embodiments, the storage objects 109 may be utilized within the system 100 in any application or to perform any function. Any number of storage objects 109 may be stored in the storage 124 of a given node 110.

In another embodiment, one or more of the storage objects 109 associated with the node 110 may be stored in the memory 122 instead of or in addition to the storage 124. For example, various storage objects 109 or portions of storage objects 109 may be transferred in and out of memory 122 from storage 124 as necessary, e.g., as required by other software executing on the node 110.

In one embodiment, each storage object 109 may have an identifier (ID). The ID of a storage object 109 may comprise any kind of information usable to identify the storage object 109, such as numeric or textual information. In one embodiment, a storage object ID may comprise a 128-bit Universally Unique ID (UUID).

Figure 3:
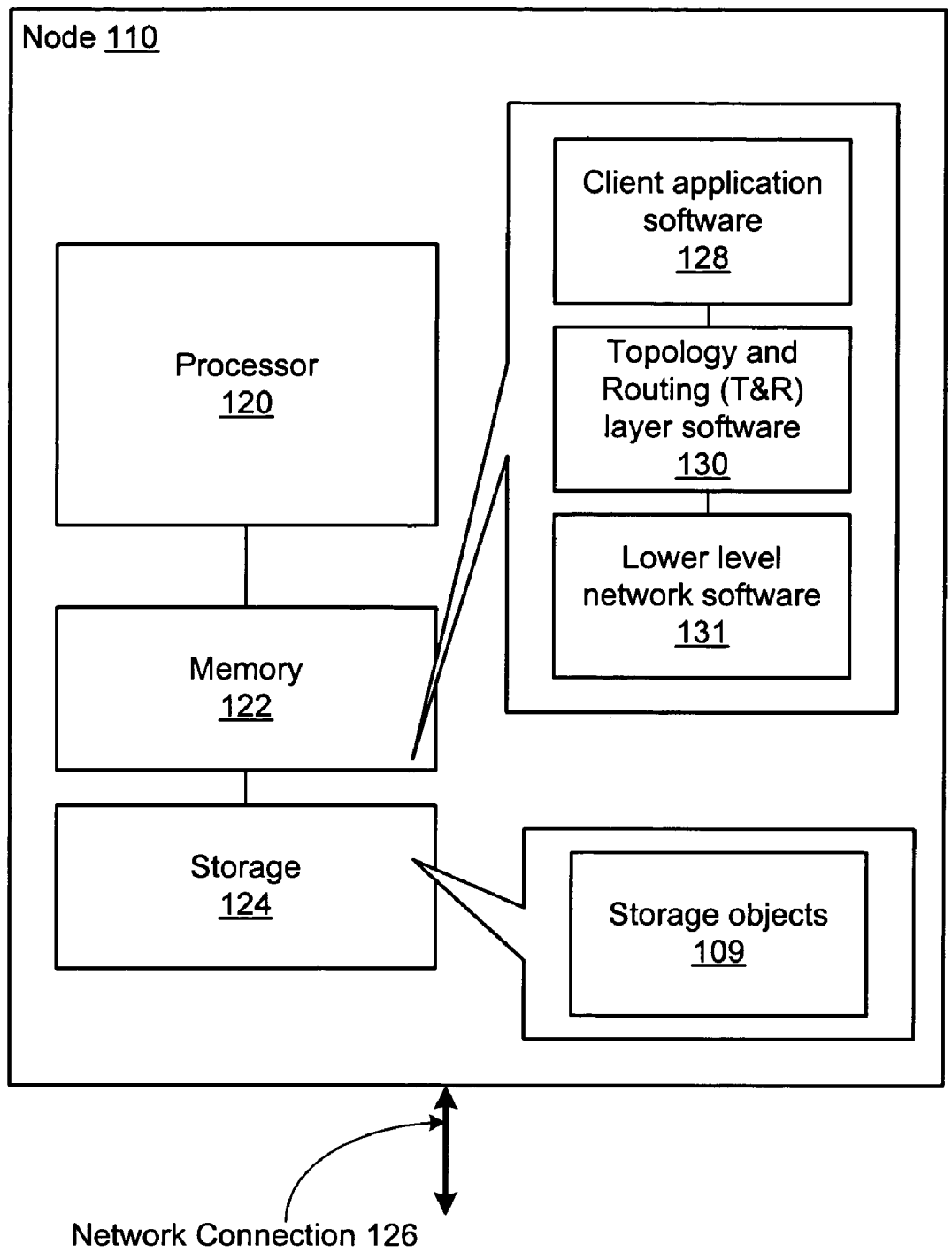
FIG. 3 illustrates another embodiment of a node in the system.

In FIG. 3, another embodiment of a node 110 in the system 100 is illustrated. In this embodiment, the memory 122 may store lower level network software 131. The lower level network software 131 (also referred to as link layer software) may be executable by the processor 120 to interact with or control the network connection 126, e.g., to send and receive data via the network connection 126. The lower level network software 131 may also be responsible for discovering or setting up communication links from the node 110 to other nodes 110. The memory 122 may also store topology and routing (T&R) layer software 130 which utilizes the lower level network software 131. Memory 122 may also store client application software 128 which utilizes the T&R layer software 130.

The T&R layer software 130 may be executable by the processor 120 to create and manage data structures allowing client application software 128 to communicate with other nodes 110 on the system 100, e.g., to communicate with other client application software 128 executing on other nodes 110. In one embodiment, the client application software 128 may utilize the T&R layer software 130 to send messages to other nodes 110. Similarly, the T&R layer software 130 may pass messages received from other nodes 110 to the client application software 128, e.g., messages which originate from client application software 128 executing on other nodes 110. The T&R layer software 130 may also be involved in forwarding messages routed through the local node 110, where the messages originate from another node 110 and are addressed to another node 110 in the system 100.

In one embodiment the functionality of the T&R layer software 130 may be modularized into builder functionality and router functionality. For example, a builder component or engine 132 may be responsible for creating and managing data structures or routing information 136 representing topology of the system 100. A router component or message routing engine 134 may utilize the data structures or routing information 136 to send or forward messages to other nodes 110 in the system 100. The builder 132 and router 134 may interface with each other as necessary. For example, in the event of a network failure that invalidates existing routing information, the router 134 may request the builder 132 to recover or rebuild routing information 136 so that the router 134 can send or forward a message using a different route.

Figure 4:
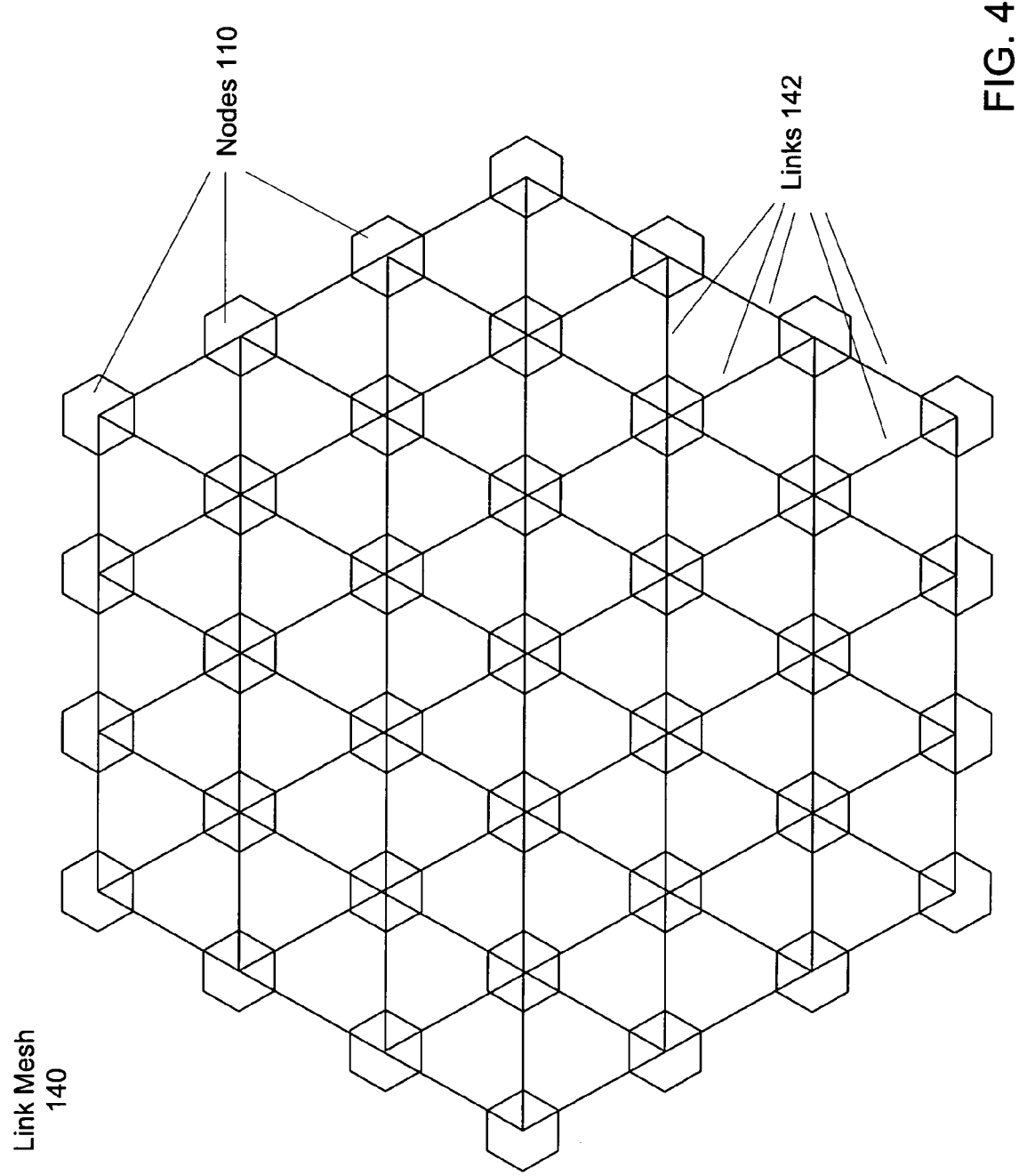
FIG. 4 illustrates a link mesh utilized by the system according to one embodiment.

FIG. 4 illustrates a link mesh 140 utilized by the system 100 according to one embodiment. In this embodiment, as each node 110 joins the system 100, the node 110 may establish links 142 with at least a subset of other nodes 110 in the system 100. As used herein, a link 142 comprises a virtual communication channel or connection between two nodes 110. The lower level network software 131 executing on a given node 110 may be responsible for performing a node discovery process and creating links with other nodes 110 as the node 110 comes online in the system 100. The nodes 110 with which a given node 110 establishes links are also referred to herein as neighbor nodes. In one embodiment, the lower level network software 131 may include a link layer which invokes a node discovery layer and then builds virtual node-to-node communication channels or links 142 to the discovered nodes 110.

The resulting set of connected nodes 110 is referred to herein as a link mesh 140. In FIG. 4, each hexagon represents a node 110, and each line represents a link 142 between two nodes 110. It is noted that FIG. 4 is exemplary only, and in various embodiments, any number of nodes 110 may be connected by the link mesh 140, and each node 110 may establish links 142 to any number of neighbor nodes 110.

In one embodiment, nodes 110 in the system 100 may be organized or divided into multiple realms. As used herein, a realm refers to a group of nodes 110 that communicate with each other in a low-latency, reliable manner and/or physically reside in the same geographic region. In one embodiment, each realm may comprise a local area network (LAN). As used herein, a LAN may include a network that connects nodes within a geographically limited area. For example, one embodiment of a LAN may connect nodes within a 1 km radius. LANs are often used to connect nodes within a building or within adjacent buildings. Because of the limited geographic area of a LAN, network signal protocols that permit fast data transfer rates may be utilized. Thus, communication among nodes 110 within a LAN (or within a realm) may be relatively efficient. An exemplary LAN may include an Ethernet network, Fiber Distributed Data Interface (FDDI) network, token ring network, etc. A LAN may also connect one or more nodes via wireless connections, such as wireless Ethernet or other types of wireless connections.

In one embodiment, each realm or LAN may have an identifier (ID). The ID of a realm may comprise any kind of information usable to identify the realm, such as numeric or textual information. In one embodiment, a realm ID may comprise a 128-bit Universally Unique ID (UUID).

For any given node 110 in a given realm, links may be built from the node 110 to other nodes 110 in the same realm and/or to nodes 110 in other realms (remote realms). The term "near neighbors" may be used to refer to nodes 110 to which the given node 110 is connected in the same realm. The term "remote neighbors" may be used to refer to nodes 110 to which the given node 110 is connected in remote realms. As described below, as various messages are sent from a given node 110 in a given realm to other nodes 110, the messages may be sent to near neighbors and/or remote neighbors. In one embodiment, send operations may be restricted to the local realm where possible. This may be useful, for example, to avoid the overhead of a wide area network (WAN) transfer. In one embodiment, an application programming interface (API) for sending a message may allow the client application software 128 executing on a node 110 to specify whether or how to restrict the send operation in this manner.

Figure 5:
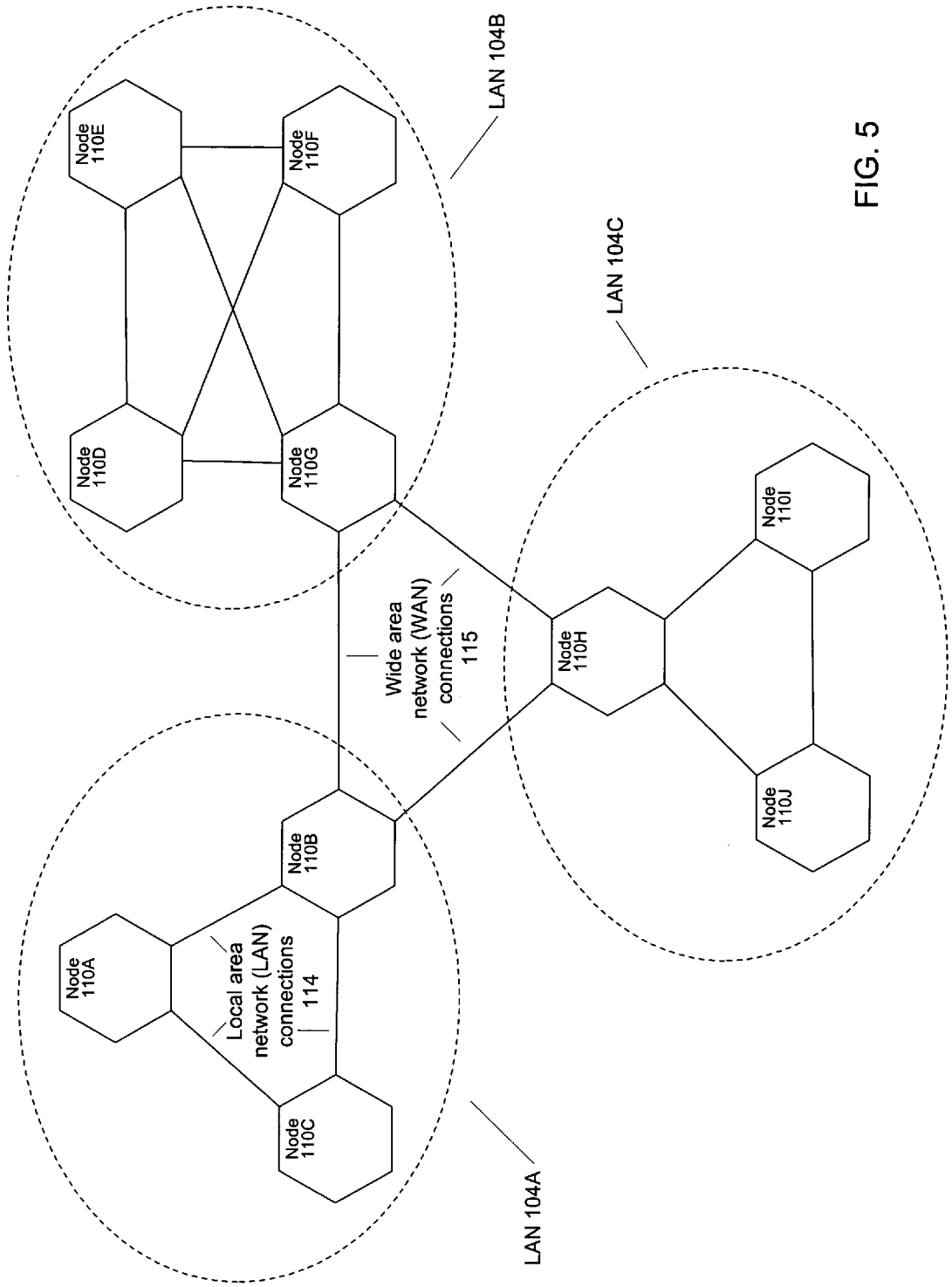
FIG. 5 illustrates one embodiment of the system organized into three local area networks (LANs)

FIG. 5 illustrates one embodiment of a system 100 organized into three LANs 104. LAN 104A includes nodes 110A-110C; LAN 104B includes nodes 110D-110G; and LAN 104C includes nodes 110H-110J. Each line connecting two nodes 110 within a LAN 104 may represent a LAN connection 114, e.g., an Ethernet connection, FDDI connection, token ring connection, or other connection, depending on the type of LAN utilized.

As used herein, a "wide area network (WAN) connection" may comprise a network connection between two nodes in different realms or LANs 104. As shown in FIG. 5, WAN connections 115 may be utilized to interconnect the various realms, e.g., LANs 104, within the system 100. A WAN connection may allow two nodes 110 that are separated by a relatively long distance to communicate with each other. For example, in one embodiment a WAN connection 115 may connect two nodes 110 that are separated by 1 km or more. (WAN connections 115 may also be used to interconnect two nodes 110 in different realms or LANs, where the two nodes 110 are separated by a distance of less than 1 km.) In one embodiment, the data transfer rate via a WAN connection 115 may be relatively slower than the data transfer rate via a LAN connection 114. In various embodiments, a WAN connection 115 may be implemented in various ways. A typical WAN connection may be implemented using bridges, routers, telephony equipment, or other devices.

It is noted that FIG. 5 illustrates a simple exemplary system 100. In various embodiments, the system 100 may include any number of realms or LANs 104, and each realm or LAN 104 may include any number of nodes 110. Also, although FIG. 5 illustrates an example in which a single node from each realm is connected to a single node of each of the other realms, in various embodiments, various numbers of WAN connections 115 may be utilized to interconnect two realms or LANs. For example, a first node in a first realm may be connected to both a second node and a third node in a second realm. As another example, a first node in a first realm may be connected to a second node in a second realm, as well as a third node in the first realm being connected to a fourth node in the second realm.

Figure 6:
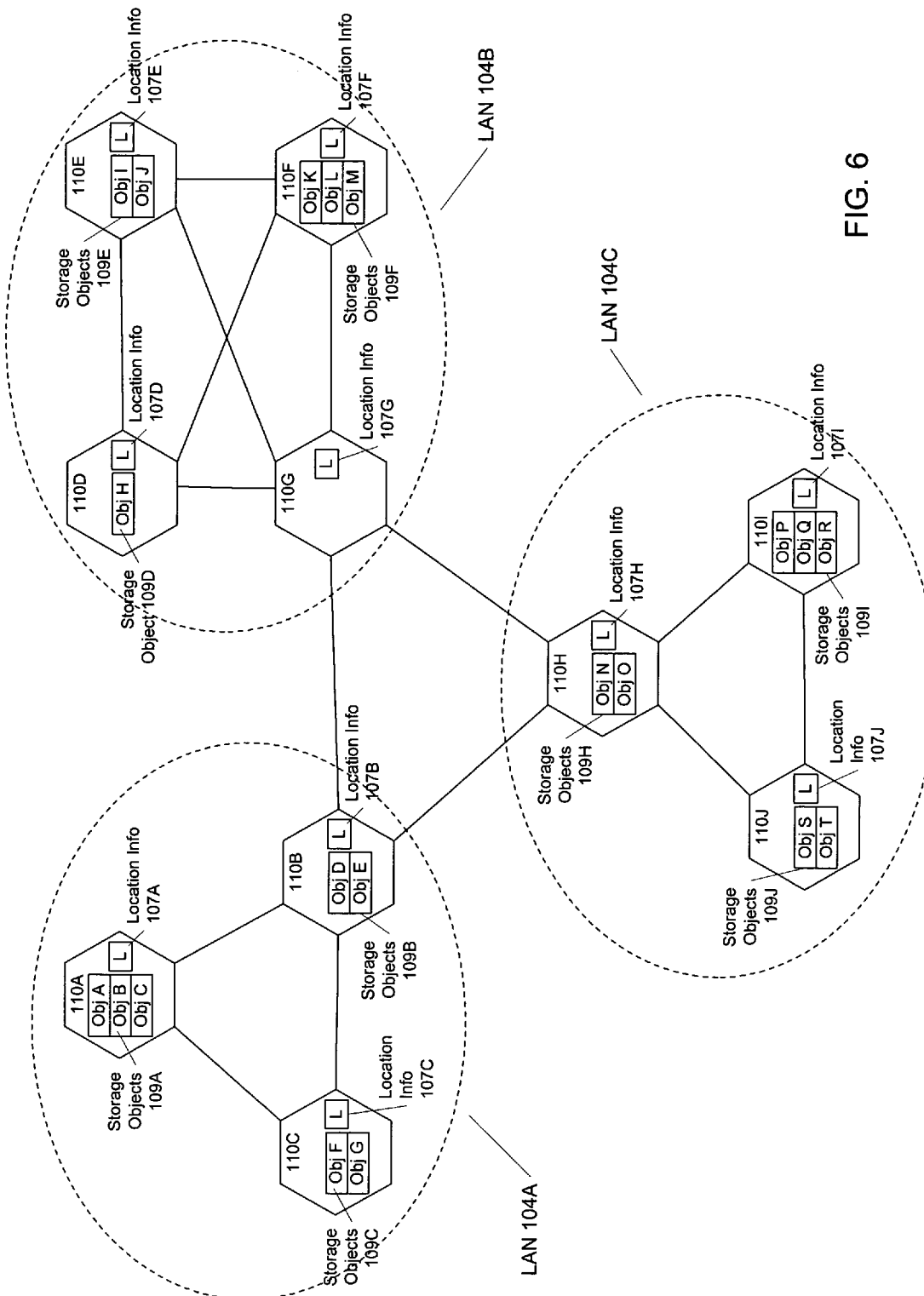
FIG. 6 illustrates a system similar to the system of FIG. 5 and illustrates various storage objects stored by nodes.

As described above with reference to FIG. 2, in one embodiment various nodes 110 in the system 100 may store storage objects 109. FIG. 6 illustrates a system 100 similar to the system illustrated in FIG. 5, in which various storage objects 109 are stored by nodes 110. For example, node 110A stores the storage objects 109, Obj A, Obj B, and Obj C; node 110B stores the storage objects 109, Obj D and Obj E; etc.

In many applications, it may be necessary for nodes 110 to determine the location of various storage objects 109 located or stored on other nodes. For example, a first node 110 may need to determine the location of a first storage object 109, i.e., may need to determine which node 110 in the system 100 stores the first storage object 109. This may be necessary, for example, if the first node 110 (or client application software 128 executing on the first node 110) needs to access the first storage object 109, e.g., to read data from and/or write data to the first storage object 109.

In one embodiment, location information may be stored on one or more nodes 110 in the system 100. In the example of FIG. 6, each node 110 stores location information 107. The location information on each node 110 may include information that maps IDs of one or more storage objects 109 to the respective nodes 110 on which the storage objects 109 are stored. Thus, when a first node 110 needs to locate a first storage object 109, the first node 110 may access the location information 107 stored on one or more nodes 110 to determine the location of the first storage object 109. The location information 107 on each node 110 may be stored in the memory 122 and/or the storage 124 of the respective node 110.

It is noted that FIGS. 5 and 6 illustrate simple systems for exemplary purposes. In various embodiments, any number of realms or LANs may be present in the system 100, and each realm may include any number of nodes. Also, nodes within a realm may be networked together in any of various ways, and realms may be interconnected in any of various ways. With respect to FIG. 6, in various embodiments, each node 110 may store any number of storage objects 109. In one embodiment, some nodes 110 may not store any storage objects 109. For example, in FIG. 6, node 110G does not store any storage objects 109. A node 110 that does not store any storage objects 109 may still access or utilize storage objects 109 stored on other nodes 110 and may also store location information 107 regarding locations of storage objects 109 stored on other nodes 110. In one embodiment, one or more nodes may act as lookup servers operable to store lookup information 107 but may not themselves store and/or may not access storage objects 109.

Also, in one embodiment some nodes 110 may not store location information 107. For example, in one embodiment, only a subset of the nodes 110 in the system 100 may be responsible for storing location information 107 that can be accessed to lookup locations of storage objects 109 in response to lookup queries received from other nodes. A node 110 that does not store location information 107 may still store one or more storage objects 109.

For a system that utilizes a large number of storage objects 109 and/or includes a large number of nodes 110, it may be inefficient to store location information on every node such that the location information on every node maps every storage object 109 to its respective location. Thus, the location information 107 on each node 110 may map only a subset of the storage objects 109 to their locations. When a first node 110 needs to determine the location of a first storage object 109, the first node 110 may determine a second node 110 whose location information 107 specifies the location of the first storage object 109, e.g., specifies a third node 110 on which the first storage object 109 is located or stored. The first node 110 may then communicate with the second node 110 to determine the location of the first storage object 109. For example, the first node 110 may send a message to the second node 110 requesting the second node 110 to look up and return the location of the first storage object 109.

In various embodiments, any of various techniques may be utilized to determine which nodes 110 store location information 107 for which storage objects 109. Exemplary techniques for making this determination are described below.

In one embodiment, a hierarchical technique may be utilized such that a first node 110 first determines a second node 110 within its own realm or LAN 104 to check for the location of a storage object 109. If the location information 107 on the second node 110 does not specify the location of the particular storage object 109, then the first node 110 may determine a third node 110 within a remote realm or LAN 104 to check for the location of the storage object 109.

In one embodiment, this hierarchical lookup technique may be implemented in such a way that for storage objects within a given realm, nodes within that realm do not have to communicate with nodes outside the realm to determine the locations of those storage objects, but rather can communicate with one or more nodes within the realm to determine the locations of those storage objects. As discussed above, in one embodiment communication within a realm or LAN may be faster than communication between different realms or LANs, e.g., because communication over a LAN connection 114 may be faster than communication over a WAN connection 115. Thus, efficiency of the system may be increased by enabling lookup operations for storage objects within a realm to be performed within that realm.

Figure 7:
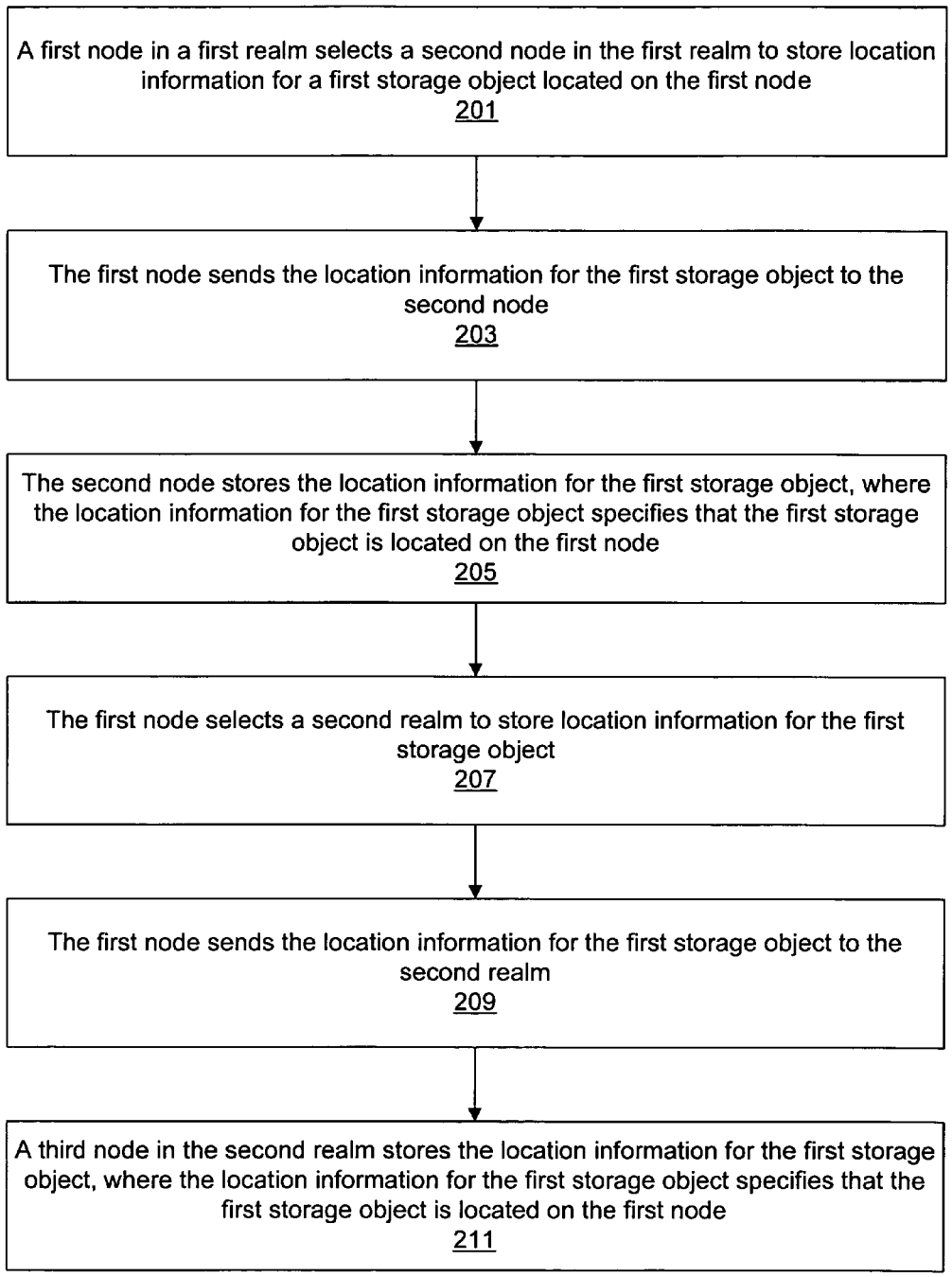
FIG. 7 is a flowchart diagram illustrating one embodiment of a method for storing location information for a first storage object.

Suppose that a first storage object 109 is newly created or stored on a first node 110 in a first realm (e.g., a first LAN). The first node may need to store location information for the first storage object in such a way as to enable the hierarchical lookup technique described above. FIG. 7 is a flowchart diagram illustrating one embodiment of a method for storing location information for the first storage object. It is noted that FIG. 7 illustrates one exemplary embodiment, and various alternative embodiments are contemplated.

In 201, the first node 110 in the first realm may select a second node 110, also referred to as the location node, in the first realm to store location information for the first storage object 109 located on the first node 110. In various embodiments, any technique may be used to select which node in the first realm should store the location information for the first storage object. The technique used to select the location node is preferably a deterministic technique such that regardless of which specific node the first node 110 is, the first node 110 will select the same location node. In other words, no matter which node performs the mapping of the storage object to the location node, the same location node may be selected.

In one embodiment, the second node, i.e., the location node, may be selected based on information regarding the first storage object. For example, in one embodiment the first storage object may have an ID, e.g., a UUID such as described above, and the second node may be selected based on a relation between this ID and IDs of nodes in the first realm, as described in more detail below.

In 203, the first node 110 may send the location information for the first storage object 109 to the second node 110. For example, the first node 110 may send a message to the second node 110 requesting the second node 110 to store the location information for the first storage object 109 in the second node 110's location information 107. The location information for the first storage object 109 may comprise information indicating that the first storage object 109 is located or stored on the first node 110. For example, in one embodiment the location information for the first storage object 109 may associate an ID of the first storage object 109 with an ID of the first node 110.

In 205, the second node may store the location information for the first storage object that was received from the first node. For example, the second node may add information to its location information 107 to indicate that the first storage object is located on the first node. After storing the location information for the first storage object, the second node may be operable to lookup or retrieve the location information for the first storage object from the second node's location information 107. For example, the second node may lookup the location information for the first storage object in response to a query from another node, as described below.

In 207, the first node may select a second realm (e.g., a second LAN) to store location information for the first storage object. In various embodiments, any technique may be used to determine which remote realm to choose as the second realm. The technique used to select the second realm is preferably a deterministic technique such that regardless of which specific node the first node is and regardless of which realm the first node is in, the first node will select the same realm as the second realm. In other words, no matter which node performs the mapping of the storage object to the second realm, the same realm may be selected as the second realm.

In one embodiment, the second realm may be selected based on information regarding the first storage object. For example, in one embodiment the second realm may be selected based on a relation between an ID of the first storage object and IDs of realms in the system 100, as described in more detail below.

In 209, the first node may send the location information for the first storage object to the second realm, i.e., to a node within the second realm. In 211, a third node within the second realm may store the location information for the first storage object. For example, the third node may add information to its location information 107 to indicate that the first storage object is located on the first node. After storing the location information for the first storage object, the third node may be operable to lookup or retrieve the location information for the first storage object from the third node's location information 107. For example, the third node may lookup the location information for the first storage object in response to a query from another node, as described below.

In various embodiments, the first node may send the location information for the first storage object to any node within the second realm. In one embodiment the first node may be operable to determine which third node within the second realm should store the location information for the first storage object and may send the location information directly to the third node (or may send a message addressed to the third node to another node in the second realm, which then forwards the message to the third node).

In another embodiment, the first node may not determine which third node within the second realm should store the location information for the first storage object. Instead, the first node may send the location information to a node within the second realm that is designated as a realm representative. The realm representative node may then determine which third node within the second realm should store the location information for the first storage object and may forward the location information to the third node. In various embodiments, any technique may be used to select which node in the second realm should store the location information for the first storage object. In one embodiment, the third node may be selected based on information regarding the first storage object. For example, in one embodiment the third node may be selected based on based on a relation between an ID of the first storage object and IDs of nodes in the second realm, as described in more detail below. The embodiment in which the first node sends the location information to a realm representative node and the realm representative node determines the third node may be advantageous in that the first node is not required to have knowledge of node IDs for nodes within the second realm.

Figure 8:
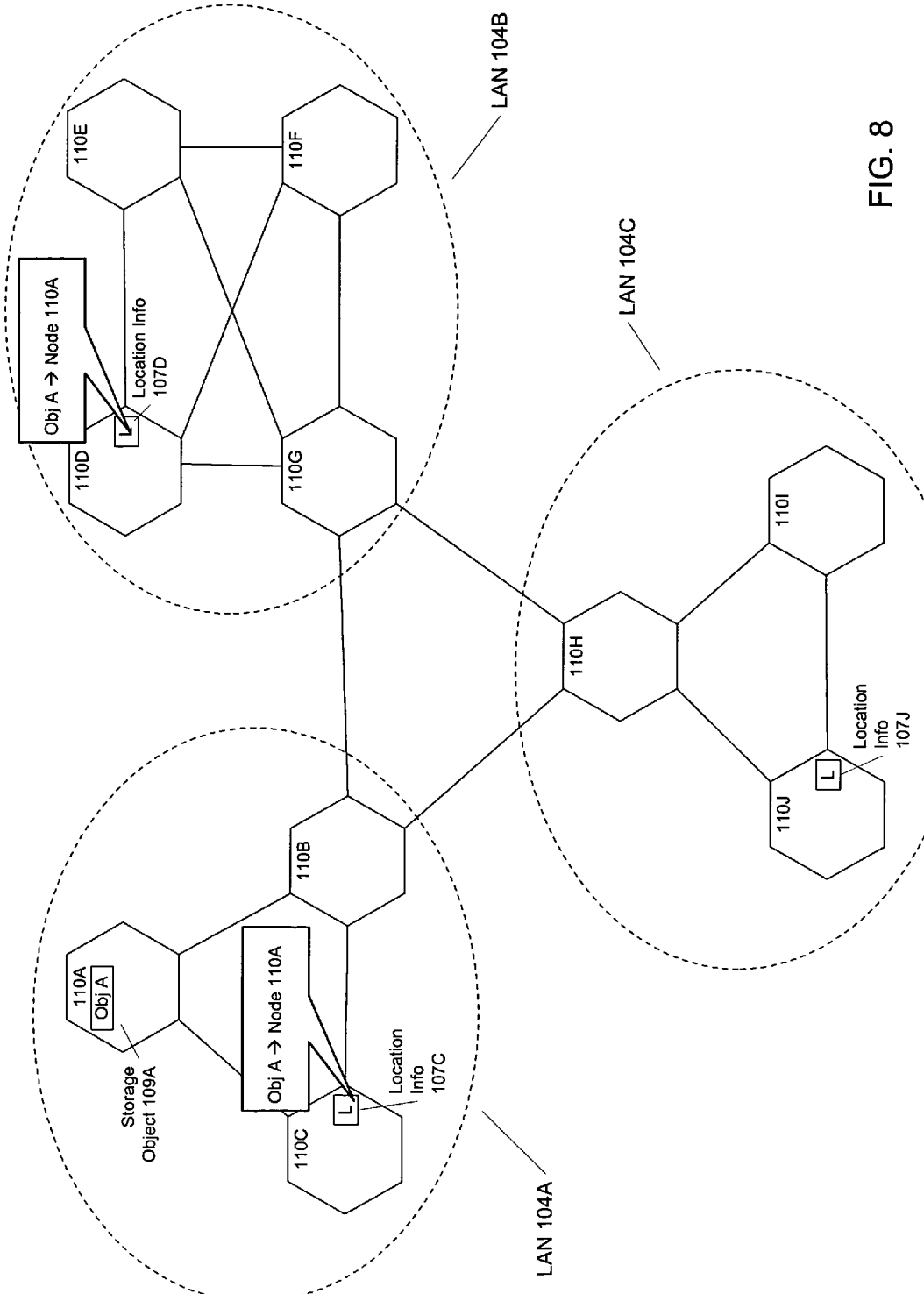
FIG. 8 illustrates an exemplary system in which the method of FIG. 7 is utilized.

FIG. 8 illustrates the system 100 of FIG. 6, in which node 110A acts as the first node 110 described above with reference to FIG. 7. Items illustrated in FIG. 6 that are not necessary to understand FIG. 8 are not illustrated. In this example, the first realm comprises the LAN 104A, and node 110A selects node 110C as the second node within the LAN 104A to store location information for the storage object 109 Obj A stored on node 110A. As shown, node 110C has stored location information for Obj A in its location information 107C. The location information for Obj A indicates that Obj A is stored on node 110A.

Node 110A also selected the LAN 104B as the second realm to store the location information for Obj A. As shown, node 110D was selected as the third node within LAN 104B to store the location information for Obj A in its location information 107D. The location information for Obj A indicates that Obj A is stored on node 110A. In one embodiment, the location information may also indicate the node 110A is in the LAN 104A, e.g., the location information may include an ID of the first realm (an ID of the LAN 104A).

Figure 9:
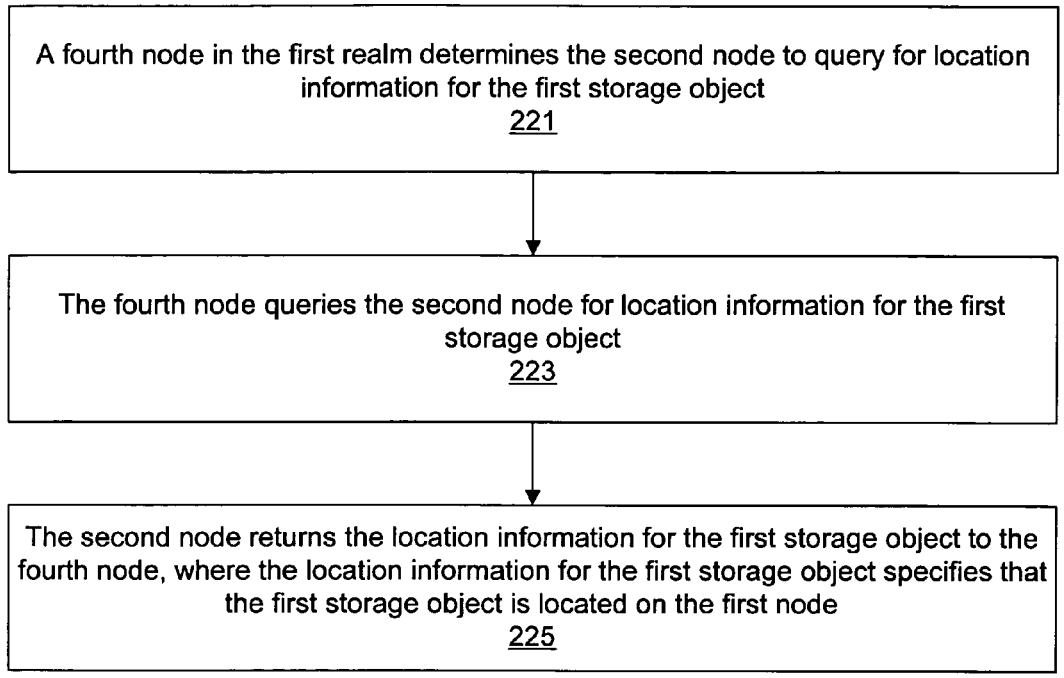
FIG. 9 is a flowchart diagram illustrating one embodiment of a method for retrieving the location information for the first storage object from within a local LAN.

Referring now to the flowchart of FIG. 9, suppose that a fourth node in the first realm needs to determine the location of the first storage object, e.g., because the fourth node needs to access the first storage object. As shown in 221, the fourth node may determine the second node to query for location information for the first storage object. In various embodiments, any technique may be used to determine that the second node is the appropriate node to query. In one embodiment, the technique used by the fourth node to determine the second node may be the same as the technique used by the first node to select the second node. For example, in one embodiment the second node may be selected in each case based on a relation between the ID of the first storage object and IDs of nodes in the first realm, as described in more detail below.

In 223, the fourth node may query the second node for location information for the first storage object. For example, the fourth node may send a message to the second node identifying the first storage object (e.g., by including the ID of the first storage object in the message) and requesting the second node to lookup and return the location information for the first storage object.

In response, the second node may access its location information 107 to lookup the location information for the first storage object. In 225, the second node may return the location information for the first storage object to the fourth node. As described above, the location information for the first storage object may specify that the first storage object is located on the first node. For example, the second node may return a message to the fourth node indicating the ID of the first node. The fourth node may then utilize the location information to access the first storage object on the first node.

Referring again to FIG. 8, in this example any of nodes 110A-110C may act as the fourth node within the first realm (LAN 104A). For example, if node 110A or node 110B is the fourth node, then a message may be sent to node 110C, and node 110C may return the location information for the first storage object 109, Obj A, as described above. If node 110C is the fourth node then it may not be necessary to send a message to itself. For example, when needing to determine the location of the first storage object 109 Obj A, node 110C may determine that it itself has the location information for Obj A and may simply access the location information 107C. Also, in one embodiment, if node 110A is the fourth node, node 110A may first determine whether Obj A is stored locally on node 110A and find that that is the case, making it unnecessary to send a message to node 110C to determine the location of Obj A.

Figure 10:
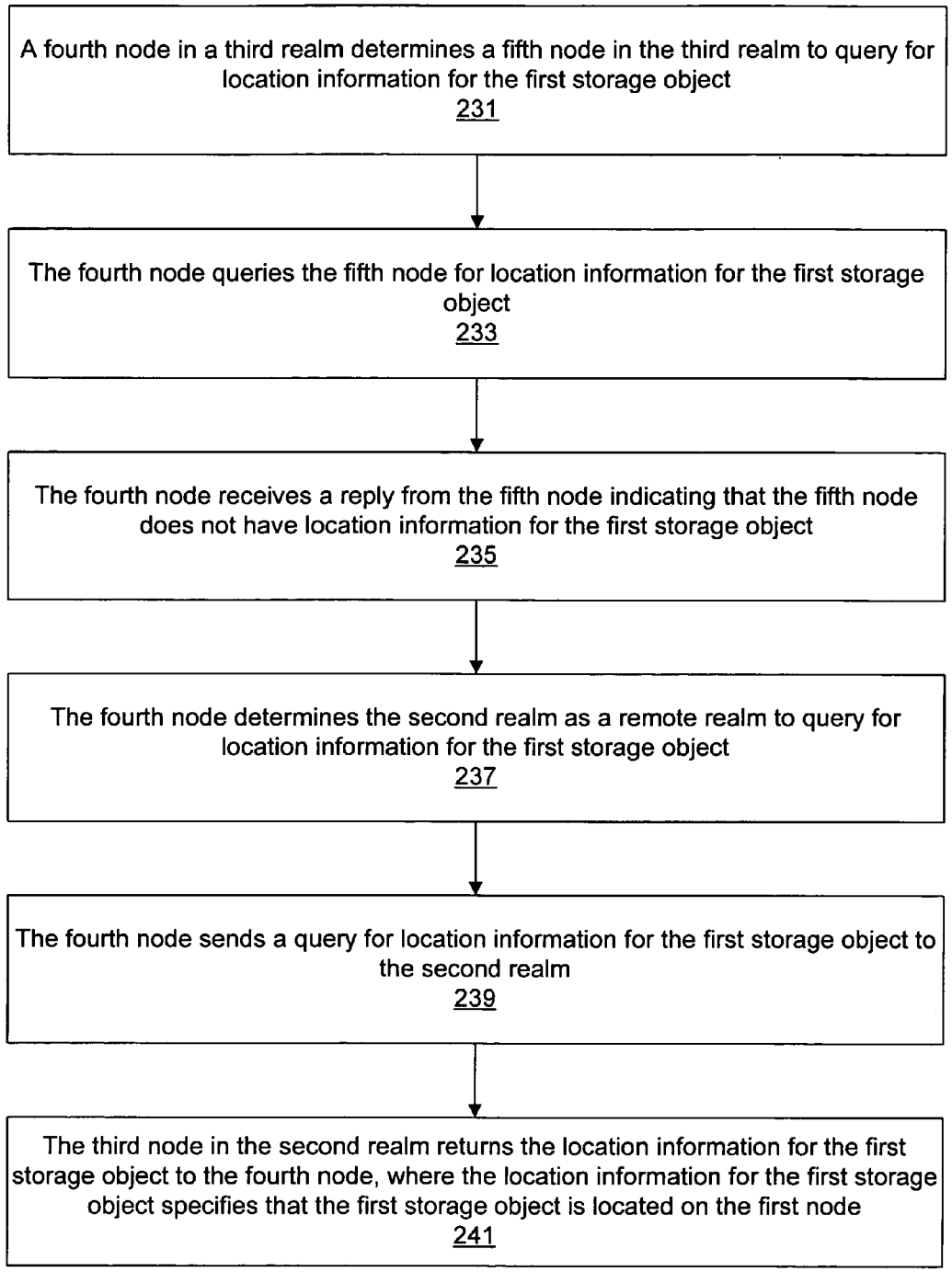
FIG. 10 is a flowchart diagram illustrating one embodiment of a method for retrieving the location information for the first storage object from a remote LAN.

Referring now to the flowchart of FIG. 10, suppose that the fourth node is in a third realm different than the first realm or the second realm, and again the fourth node needs to determine the location of the first storage object. As described above, the fourth node may thus first attempt to query a node within its local realm to find the location information for the first storage object. Thus, in 231, the fourth node may determine a fifth node in the third realm to query for location information for the first storage object, similarly as described above with respect to 221 of FIG. 9. For example, in one embodiment the fifth node may be selected based on a relation between the ID of the first storage object and IDs of nodes in the third realm.

In 233, the fourth node may query the fifth node for location information for the first storage object, similarly as described above with respect to 223 of FIG. 9. In response, the fifth node may access its location information 107 to lookup the location information for the first storage object. However, in this case the fifth node may find that it does not have location information for the first storage object. The fifth node may thus send a reply to the fourth node indicating that this is the case. In 235, the fourth node may receive the reply from the fifth node indicating that the fifth node does not have location information for the first storage object.

Since the fourth node could not find the location information for the first storage object in its local realm, the fourth node may next attempt to find the location information in a remote realm. In 237, the fourth node may determine the second realm as a remote realm to query for location information for the first storage object. In various embodiments, any technique may be used to determine that the second realm is the appropriate realm to query. In one embodiment, the technique used by the fourth node to determine the second realm may be the same as the technique used by the first node to select the second realm in 207 of FIG. 7. For example, in one embodiment the second realm may be selected in each case based on a relation between the ID of the first storage object and IDs of IDs of realms in the system 100, as described in more detail below.

In 239, the fourth node may send a query for location information for the first storage object to the second realm. In various embodiments, the fourth node may send the query for the location information to any node within the second realm. The query may be received either directly or indirectly by the third node in the second realm. For example, in one embodiment the fourth node may be operable to determine which third node within the second realm stores the location information for the first storage object and may send the location information directly to the third node (or may send a message addressed to the third node to another node in the second realm, which then forwards the message to the third node).

In another embodiment, the fourth node may not determine which third node within the second realm stores the location information for the first storage object. Instead, the fourth node may send the query for the location information to a node within the second realm that is designated as a realm representative. The realm representative node may then determine which third node within the second realm stores the location information for the first storage object and may forward the query for the location information to the third node.

In various embodiments, any technique may be used to determine which node in the second realm stores the location information for the first storage object. In one embodiment, the technique used may be the same as the technique used when selecting the third node as the node to store the location information received from the first node. For example, in one embodiment the third node may be selected in each case based on a relation between the ID of the first storage object and IDs of nodes in the second realm, as described in more detail below. The embodiment in which the fourth node sends the query for the location information to a realm representative node in the second realm and the realm representative node determines the third node may be advantageous in that the fourth node is not required to have knowledge of node IDs for nodes within the second realm.

In response to the query for the location information, the third node may access its location information 107 to lookup the location information for the first storage object. In 241, the third node may return the location information for the first storage object to the fourth node. As described above, the location information for the first storage object may specify that the first storage object is located on the first node. For example, the third node may return a message to the fourth node indicating the ID of the first realm and the ID of the first node. The fourth node may then utilize the location information to access the first storage object on the first node.

Referring again to FIG. 8, in this example the third realm may be the LAN 104C, and any of nodes 110H-110J may act as the fourth node within the third realm. For example, suppose that node 110I acts as the fourth node. Node 110I may determine any of nodes 110H-110J as the fifth node within the third realm. For example, suppose that node 110I determines node 110J as the fifth node. Thus, node 110I may query node 110J for location information for the first storage object (Obj A). Node 110J may attempt to find the location information in its location information 107J and may return a reply to node 110I indicating that the location information was not found. Node 110I may then determine that LAN 104B is the appropriate remote realm to query for the location information for Obj A and may send the query to a node within LAN 104B. Node 110D may receive the query (either directly or indirectly as described above) and may return the location information for Obj A, as described above.

In various embodiments, the location information 107 discussed above may be structured or stored in any desired way. Any of various data structures or algorithms may be used to store the location information 107. In one embodiment, the location information 107 on a given node 110 may be implemented as a table comprising a plurality of table entries, where each table entry specifies location information for a particular storage object 109. For example, in FIG. 8, the location information 107C and 107D on nodes 110C and 110D may each comprise a table entry specifying that the storage object 109 Obj A is stored on node 110A. In one embodiment, the location information table on each node 110 may be implemented as a hash table. For example, hash table entries for each storage object 109 may be keyed on the ID of the storage object 109. In other embodiments, location information 107 may be stored or structured in any other desired way.

As described above, the location information 107 stored by a given node may include location information specifying locations of storage objects located within the node's own realm (referred to as local location information), as well as location information specifying locations of storage objects located within remote realms (referred to as remote location information). In one embodiment, the local location information and the remote location information may be stored separately. For example, the location information 107 on a given node may include both a first hash table (referred to as a local hash table) comprising entries specifying locations of storage objects located within the node's own realm and a second hash table (referred to as a global hash table) specifying locations of storage objects located within any realm in the system 100.

The first hash table stored on a given node may effectively comprise a portion of a larger distributed hash table that is distributed over all the nodes in the node's realm (or distributed over all the nodes in the realm that store location information). Thus, for each realm, nodes in the realm may be configured to collectively store a distributed hash table specifying location information for storage objects stored on nodes within that realm.

The second hash table stored on a given node may effectively comprise a portion of a larger distributed hash table that is distributed over all the nodes in the system (or distributed over all the nodes in the system that store location information). Thus, nodes throughout the system may be configured to collectively store a global distributed hash table specifying location information for storage objects stored on nodes throughout the system.

In another embodiment, the local location information and the remote location information maintained by a given node may be stored together. For example, the local location information and the remote location information may be stored in a single table. Each table entry may simply indicate a mapping of a storage object ID to location information for the respective storage object, regardless of whether the storage object is located in the local realm or a remote realm.

Referring again to 201 of FIG. 7, any technique may be used to select which node in the local realm (i.e., the second node) should store the location information for the first storage object, as noted. In one embodiment, the first storage object may have an ID implemented as a Universally Unique ID (UUID). Each node in the local realm may also have an ID implemented as a UUID. In one embodiment, the second node may be selected based on a relation between the first storage object's UUID and UUIDs of nodes in the local realm. As one example, the node whose UUID is the highest UUID less than the UUID of the first storage object may be selected as the second node. (Each node in the local realm may know the UUIDs of the other nodes in the local realm.) If the first storage object's UUID is less than the UUID of all nodes in the realm, the node with the highest UUID may be selected as the second node. As another example, the node whose UUID is the lowest UUID greater than the UUID of the first storage object may be selected as the second node, where the node with the lowest UUID is selected as the second node if the first storage object's UUID is greater than the UUID of all nodes in the realm.

With respect to 221 of FIG. 9 in which the fourth node determines which node in the local realm is the second node to query for location information of the first storage object, in one embodiment this determination may be performed in the same way, e.g., by selecting the node whose UUID is the highest UUID less than the UUID of the first storage object.

With respect to the selection of which third node to select in the second realm to store the location information for the first storage object, this selection may be performed in a similar manner. For example, the node in the second realm whose UUID is the highest UUID less than the UUID of the first storage object may be selected as the second node. Similarly, with respect to FIG. 10 when the third node is again determined during the query process, the third node may be determined using the same technique.

In one embodiment, new nodes may be added to or come online in various realms as the system is active. In one embodiment, location information may be transferred from other nodes to a new node when the new node joins a realm. For example, suppose that a new node is added to the first realm described above with reference to FIG. 7. The second node to store location information for the first storage object may have been selected as described above as the node having the highest UUID less than the UUID of the first storage object. If the UUID of the new node is higher than the UUID of the second node and less than the UUID of the first storage object, then the second node may communicate with the new node to transfer location information for the first storage object from the second node to the new node. Nodes that need to lookup the location of the first storage object may query the new node for the location information.

Similarly, nodes may be removed from the system or may fail as the system is active. In this case, location information previously stored by these nodes may be re-located to other nodes. For example, each node which previously stored location information on a node that is subsequently removed from the system may store the location information on a new node, e.g., by selecting the new node based on its UUID, as described above.

With respect to 207 of FIG. 7 in which the first node selects a second realm to store location information for the first storage object, in one embodiment this selection may be made based on a relation between the UUID of the first storage object and UUIDs of realms in the system. In one embodiment, the UUID of the first storage object may first be transformed, for example by changing its endianness, e.g., by swapping the most significant and least significant longs in the UUID. The transformed UUID may then be compared to the realm UUIDs. (The first node may know the realm UUIDs for all the realms, or the first node may communicate with a realm representative node in its local realm, where the realm representative node knows the realm UUIDs for all the realms.) The realm having the highest UUID less than the transformed UUID may be selected as the second realm. If the first storage object's transformed UUID is less than the UUID of all realms in the system, the realm with the highest UUID may be selected as the second realm.

With respect FIG. 10 in which the fourth node determines which realm is the second realm to query for location information of the first storage object, in one embodiment this determination may be performed in the same way, e.g., by selecting the realm whose UUID is the highest UUID less than the transformed UUID of the first storage object.

In one embodiment, new realms may also be added to or come online in the system as the system is active. When a new realm is added, the UUID of the new realm may affect the determination of which remote realms store location information for various objects, in a manner similar to that described above. Thus, when the new realm is added, one or more nodes in one or more other realms may transfer remote location information to the new realm accordingly.

It is noted that the selection techniques described above are exemplary only. In other embodiments any other desired selection technique may be utilized to select nodes or realms. Also, as described above, in one embodiment some nodes may not store location information. UUIDs for nodes that do not store location information may be excluded from consideration in the node selection technique. In one embodiment, one or more realms in the system may also be excluded from storing location information for remote storage objects. In this embodiment, the UUIDs of these realms may be excluded from consideration in the realm selection technique.

In one embodiment, storage objects may have a limited lifetime, and various storage objects may be deleted or destroyed at times. In one embodiment, when a storage object is deleted, the node that stored the storage object may communicate with the nodes that store location information for the storage object to cause them to discard the location information.

It is noted that the method described above represent exemplary embodiments only, and numerous alternative embodiments are contemplated. As one example, in one embodiment when a first storage object is created on a first node, the first node may select multiple remote realms to which to send the first storage object's location information. In each remote realm, a node may be selected to store the location information. Thus, when another node needs to lookup the location of the first storage object, the node may determine the closest of these multiple realms and may send the lookup query to the closest realm, which may increase efficiency of the lookup operation in some cases. Having the lookup information for the first storage object stored in multiple remote realms may also benefit the system by increasing the availability of the location information. For example, if one remote realm becomes inaccessible, location information for the first storage object may still be obtained from another realm.

In other embodiments, it may be desirable to avoid the overhead of storing location information for each storage object in multiple remote realms. In one embodiment, in the event that a search for location information fails, a broadcast operation to find the storage object may be performed. The system may be designed so that the broadcasting does not affect scaling and performance of the system. First it is noted that in one embodiment, it is not necessary to search for or locate a storage object every time the storage object is accessed. For example, once a node determines the location of a storage object the first time, it may not be necessary to perform subsequent lookup operations for subsequent accesses. Also, it is only necessary to do the broadcast search when a failure causes the location information for the given storage object to be lost or when the node having the location information cannot be accessed. Also, in one embodiment nodes in the system may maintain routing information in such a way that a full broadcast over nodes in the system is not required. Routes toward the storage object may be remembered so that nodes that have not experienced failures do not need to broadcast, but instead just send a search request on the route towards the storage object.

Although the above description refers to storage objects, it is noted that various embodiments of the system and methods described above may be utilized to search for objects or software entities of any kind. As used herein, the term object may comprise a portion of data.

In one embodiment, the system and methods may be utilized by client application software 128 that executes on nodes 110 to implement distributed data storage such that data is distributed across various nodes 110 in the system 100. The search mechanisms described above may be utilized by the client software 128 to efficiently locate various storage objects or files.

It is noted that various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computer-readable storage medium storing program instructions executable to implement a method comprising:
   a first node in a first LAN selecting a second node in the first LAN to store location information for a first object, wherein the location information specifies that the first object is stored on the first node, wherein each node in the first LAN has a node ID and the first object has an object ID, and wherein the first node selects the second node based on a deterministic relation that depends on the object ID of the first object irrespective of the node ID of the first node;
   the first node sending the location information for the first object to the second node;
   the second node storing the location information for the first object in response to receiving the location information;
   the first node selecting a second LAN to store the location information for the first object;
   the first node sending the location information for the first object to the second LAN; and
   a third node in the second LAN storing the location information for the first object in response to receiving the location information;
   a fourth node in the first LAN performing a search operation to locate the first object, wherein said performing the search operation comprises:
   the fourth node selecting the second node to query for the location information for the first object;
   the fourth node querying the second node for the location information for the first object; and
   the fourth node receiving the location information for the first object from the second node in response to said querying.

2. The computer-readable storage medium of claim 1, wherein said first node sending the location information for the first object to the second LAN comprises the first node sending the location information for the first object to a representative node in the second LAN;
   wherein the representative node forwards the location information for the first object to the third node for storage.

3. The computer-readable storage medium of claim 1, wherein the method implemented by the program instructions further comprises:

the fourth node accessing the first object stored on the first node in response to receiving the location information for the first object from the second node.

4. The computer-readable storage medium of claim 1, wherein the method implemented by the program instructions further comprises:
   a fourth node in a third LAN performing a search operation to locate the first object, wherein said performing the search operation comprises:
   the fourth node selecting a fifth node in the third LAN to query for the location information for the first object;
   the fourth node querying the fifth node for the location information for the first object;
   the fourth node receiving an indication from the fifth node that the fifth node does not have the location information for the first object;
   the fourth node selecting the second LAN as a remote LAN to query for the location information for the first object;
   the fourth node sending a query for the location information for the first object to the second LAN; and
   the fourth node receiving the location information for the first object from the third node in the second LAN in response to the query sent to the second LAN.

5. The computer-readable storage medium of claim 4, wherein said fourth node sending the query for the location information for the first object to the second LAN comprises the fourth node sending the query to a representative node in the second LAN;
   wherein the representative node forwards the query to the third node.

6. The computer-readable storage medium of claim 1, wherein the first LAN and the second LAN are LANs of a plurality of LANs, wherein each LAN of the plurality of LANs has a LAN ID;
   wherein the first node selects the second LAN to store the location information for the first object based on a relation between the object ID of the first object and the LAN IDs of the LANs.

7. The computer-readable storage medium of claim 6, wherein the method implemented by the program instructions further comprises:
   the first node transforming the object ID of the first object;
   wherein said selecting the second LAN based on the relation between the object ID of the first object and the LAN IDs of the LANs comprises selecting the second LAN based on a relation between the transformed object ID of the first object and the LAN IDs of the LANs.

8. The computer-readable storage medium of claim 1, wherein the first object comprises a storage object.

9. A system comprising:
   a plurality of nodes, wherein each node is included in one of a plurality of local area networks (LANs);
   wherein the plurality of nodes includes a first node in a first LAN of the plurality of LANs, wherein the first node stores a first object, wherein the first node is configured to:
   select a second node in the first LAN to store location information for the first object, wherein the location information specifies that the first object is stored on the first node, wherein each node in the first LAN has a node ID and the first object has an object ID, and wherein the first node selects the second node based on a deterministic relation that depends on the object ID of the first object irrespective of the node ID of the first node; and
   send the location information for the first object to the second node;
   wherein the second node is configured to store the location information for the first object in response to receiving the location information;
   wherein the first node is further configured to:
   select a second LAN to store the location information for the first object; and
   send the location information for the first object to the second LAN; and
   wherein a third node in the second LAN is configured to store the location information for the first object in response to receiving the location information;
   wherein the first LAN also includes a fourth node configured to:
   select the second node to query for the location information for the first object; and
   query the second node for the location information for the first object;
   wherein the second node is configured to send the location information for the first object to the fourth node in response to said querying.

10. The system of claim 9,
    wherein said first node sending the location information for the first object to the second LAN comprises the first node sending the location information for the first object to a representative node in the second LAN;
    wherein the representative node is configured to forward the location information for the first object to the third node for storage.

11. The system of claim 9 wherein the fourth node is further configured to access the first object on the first node in response to receiving the location information for the first object from the second node.

12. The system of claim 9,
    wherein the plurality of LANs also includes a third LAN including a fourth node;
    wherein the fourth node is configured to:
    select a fifth node in the third LAN to query for the location information for the first object;
    query the fifth node for the location information for the first object;
    receive an indication from the fifth node that the fifth node does not have the location information for the first object;
    select the second LAN as a remote LAN to query for the location information for the first object; and
    send a query for the location information for the first object to the second LAN;
    wherein the third node in the second LAN is configured to send the location information for the first object to the fourth node in response to the query sent to the second LAN.

13. The system of claim 12,
    wherein said fourth node sending the query for the location information for the first object to the second LAN comprises the fourth node sending the query to a representative node in the second LAN;
    wherein the representative node is configured to forward the query to the third node.

14. The system of claim 9,
    wherein each LAN of the plurality of LANs has a LAN ID;
    wherein the first, node is configured to select the second LAN to store the location information for the first object based on a relation between the object ID of the first object and the LAN IDs of the LANs.

15. The system of claim 14,
    wherein the first node is further configured to transform the object ID of the first object;

wherein said selecting the second LAN based on the relation between the object ID of the first object and the LAN IDs of the LANs comprises selecting the second LAN based on a relation between the transformed object ID of the first object and the LAN IDs of the LANs.

16. The system of claim 9, wherein the first object comprises storage object.

17. The system of claim 9,
wherein in response to a new node joining the first LAN, the second node is configured to:
determine that the location information for the first object should be stored on the new node instead of the second node; and
communicate with the new node to transfer the location information for the first object to the new node.

18. A method comprising:
a first node in a first LAN selecting a second node in the first LAN to store location information for a first object,
wherein the location information specifies that the first object is stored on the first node, wherein each node in the first LAN has a node ID and the first object has an object ID, and wherein the first node selects the second node based on a deterministic relation that depends on the object ID of the first object irrespective of the node ID of the first node;

the first node sending the location information for the first object to the second node;
the second node storing the location information for the first object in response to receiving the location information;
the first node selecting a second LAN to store the location information for the first object;
the first node sending the location information for the first object to the second LAN; and
a third node in the second LAN storing the location information for the first object in response to receiving the location information;
a fourth node in the first LAN performing a search operation to locate the first object, wherein said performing the search operation comprises:
the fourth node selecting the second node to query for the location information for the first object;
the fourth node querying the second node for the location information for the first object; and
the fourth node receiving the location information for the first object from the second node in response to said querying.

\* \* \* \* \*